United States Patent [19]

Dominick et al.

[11] 4,233,052
[45] Nov. 11, 1980

[54] CARBON COATING FOR A STARTING MEMBER USED IN PRODUCING OPTICAL WAVEGUIDES

[75] Inventors: Ellen K. Dominick, Trumansbury; George W. Scherer, Painted Post, both of N.Y.

[73] Assignee: Corning Glass Works, Corning, N.Y.

[21] Appl. No.: 30,353

[22] Filed: Apr. 16, 1979

Related U.S. Application Data

[62] Division of Ser. No. 828,149, Aug. 26, 1977.

[51] Int. Cl.³ .................................................. C23C 13/08
[52] U.S. Cl. ........................................ 65/144; 118/730
[58] Field of Search ........................... 65/144, 3 A, 18; 264/81; 118/730

[56] References Cited

U.S. PATENT DOCUMENTS

| | | | |
|---|---|---|---|
| 3,120,450 | 2/1964 | Dienfendorf et al. | 264/81 X |
| 3,775,075 | 11/1973 | Keck et al. | 65/3 A X |
| 3,806,570 | 4/1974 | Flamenbaum et al. | 65/3 A X |
| 3,823,995 | 7/1974 | Carpenter | 65/3 A X |
| 3,933,453 | 1/1976 | Barke et al. | 65/3 A |

Primary Examiner—Richard V. Fisher
Attorney, Agent, or Firm—Walter S. Zebrowski; Richard E. Kurtz

[57] ABSTRACT

In making a preform for an optical waveguide, the bait rod is coated with carbon. After the preform is built up on the bait rod, it is easily removed. The carbon coating produces a smooth improved inner surface in the preform, thereby eliminating flaws which otherwise may be present when the preform is drawn into a waveguide.

4 Claims, 4 Drawing Figures

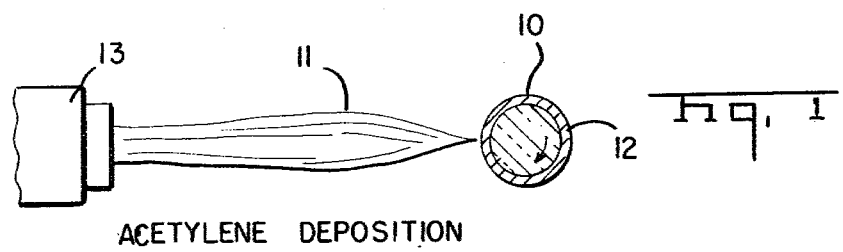
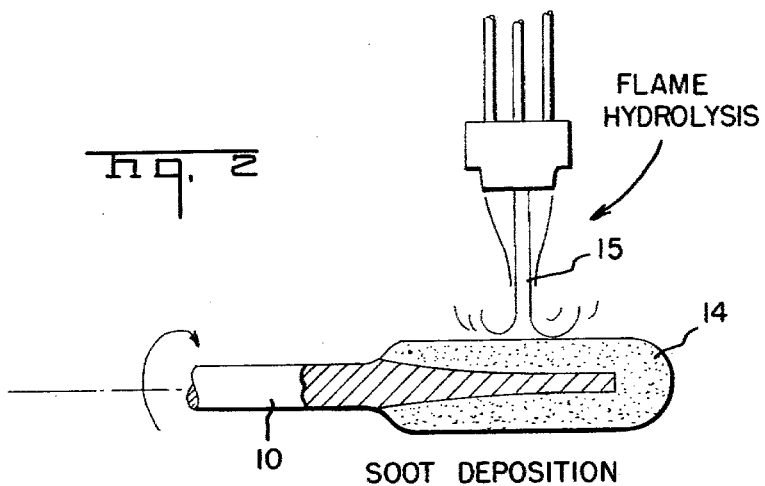
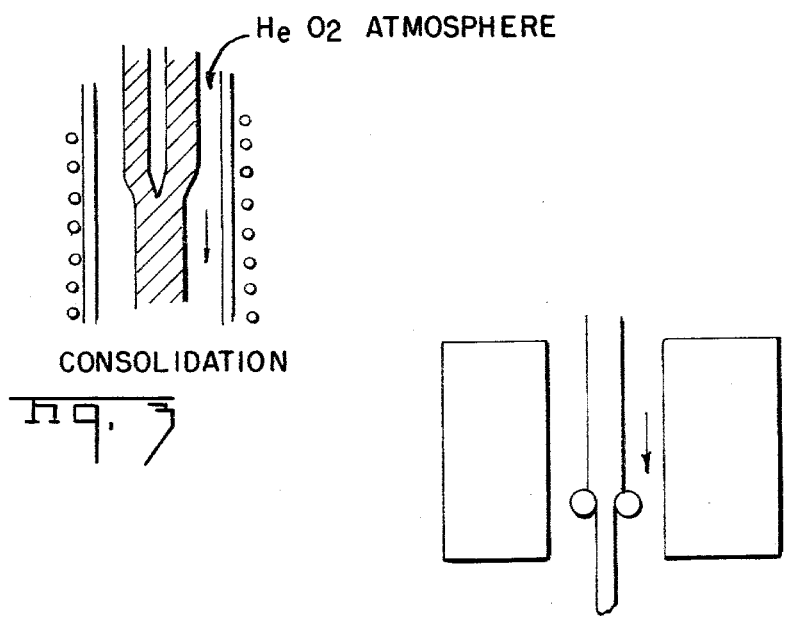

CARBON COATING FOR A STARTING MEMBER USED IN PRODUCING OPTICAL WAVEGUIDES

This application is a division of application Ser. No. 828,149 filed Aug. 26, 1977.

This invention relates to optical waveguides and more particularly to an improved process for making the preform for an optical waveguide.

Waveguides use in optical communication systems are herein referred to as "optical waveguides" and are normally constructed from transparent dielectric material such as glass or plastic.

U.S. Pat. No. 3,775,075—Keck and Maurer describes a process of making optical waveguides wherein a glass coating is deposited by flame oxidation upon a rotating glass cylinder. This process is now called outside vapor phase oxidation (OVPO); the reaction is known to be oxidation rather than hydrolysis. Thereafter the formed structure is heated and drawn into a waveguide with the glass cylinder forming the core and the coated material forming the cladding of the optical waveguide. The glass cylinder upon which the cladding material is coated is referred to as a preform.

U.S. Pat. No. 3,823,995—Carpenter describes one technique of making a preform. In this technique, glass is deposited by flame outside vapor phase oxidation (OVPO) on a rotating starting member which is referred to as a bait rod. After the core and cladding layers are deposited, the bait rod is removed. Then the structure is heated and drawn. During the drawing operation, the hollow core of the preform collapses, thereby forming a consolidated core with a cladding.

The removal of the bait rod from the preform must be carefully carried out because imperfections on the inside surface of the preform may cause flaws in the finished waveguide. Imperfections on the inner surface of the preform propagate cracking and breaking. Any imperfection in the center hole may cause bubbles to form in the waveguide which is ultimately produced causing high attenuation and rejection. As described in the aforementioned Carpenter patent, the bait rod is removed by grinding it out by means of a diamond reamer. That patent also mentions core drilling and hydrofluoric acid etching for removing the bait rod. The rough surfaces left by drilling may be smoothed by laser milling, mechanically polishing the inside surface, fire polishing the inside surface and/or washing the tube in hydrofluoric acid. All of these operations are time-consuming.

More recently, the preform has been made by first depositing a soft layer of soot on the bait rod and thereafter building up the preform with hard soot. The layer of soft soot facilitates removal of the bait rod. The soft layer shears, leaving a flaky pitted center hole in the preform. After sintering the preform to consolidate the glass, the preform still contains these flaws. A lengthy hydrofluoric acid treatment is necessary for elimination of these imperfections. Damage occurs because the preform adheres so strongly to the surface of the bait rod. When the rod is removed, the preform shears rather than releasing from the bait rod surface.

U.S. Pat. No. 3,933,453—Burke et al, describes an improved mandrel including a tubular member formed of refractory metal. U.S. Pat. No. 3,806,570—Flamenbaum et al describes the use of a fused carbon mandrel for the bait rod. However, neither of these mandrels can be removed from the preform without causing blemishes which require smoothing.

Imperfections in the center hole of the preform are a particular problem in making gradient index waveguides such as described in the aforementioned Carpenter patent. In order to get a high numerical aperture waveguide, it is necessary to introduce a sharp radial change in composition of the preform. Because of the changing thermal expansion coefficient of the composition, high stress is present. In such waveguides, it is particularly important to eliminate imperfections in the center hole of the preform. Any imperfection may lead to fracture in a high stress waveguide.

SUMMARY OF THE INVENTION

In accordance with this invention, imperfections in the center hole of a preform for an optical waveguide are reduced by coating the starting member with carbon before depositing the preform thereon. Thereafter the starting member can be removed with little detrimental effect on the preform. Separation occurs at the interface between the carbon and the starting member or by shearing of the carbon. There is no shearing of the preform. The preform has a very smooth, undisturbed center hole.

The preform is then conventionally heated to consolidate the glass. During consolidation, the carbon oxidizes, thereby completely disintegrating it. After consolidation, the preform has a smooth clean inner surface. Whereas lengthy hydrofluoric acid treatments were previously necessary to smooth the inner hole of the preform, this is no longer necessary. The inner hole can be allowed to close during the consolidation procedure, whereas in the prior art, the inner hole was not closed until drawing. Because the inner hole is closed during consolidation, it is possible to draw the waveguide at higher speeds than were previously possible.

It is an object of the present invention to provide improved optical waveguide preforms with reduced imperfections on the inside surface thereof.

It is another object of the present invention to product high numerical aperture, high stress waveguides from preforms with relatively smooth inner surfaces.

It is another object of the present invention to eliminate the etching step in the production of optical waveguides.

It is further object of the present invention to increase the drawing speed in the production of waveguides.

The foregoing and other objects, features and advantages of the invention will be better understood from the following more detailed description and appended claims.

DESCRIPTION OF THE DRAWINGS

FIG. 1 depicts the deposition of the carbon coating;

FIG. 2 depicts the step of applying glass to the preform by flame hydrolysis;

FIG. 3 depicts heating to consolidate, burn the carbon and collapse the center hole; and FIG. 4 depicts the step of drawing the preform into a waveguide.

DESCRIPTION OF THE PREFERRED EMBODIMENT

Referring to FIG. 1, a substantially cylindrical starting member 10 is continuously rotated in an acetylene flame 11 to produce a carbon coating 12 on the starting member. For example, the starting member may be a tapered alumina bait rod tapering from 0.630 to 0.570 centimeters diameter along a 63 centimeter length. Acetylene burner 13 burns acetylene in air (no oxygen gas supply) to produce carbon soot. Bait rod 10 is mounted in a lathe which rotates the rod and traverses it past the flame 11. It has been found that the thickness of the coating is not critical but 1-2 mills thickness produces satisfactory results.

After the bait rod is thoroughly coated with carbon, glass soot is deposited by flame hydrolysis as depicted in FIG. 2. The procedure described in the aforementioned Carpenter patent may be used to produce a gradient index waveguide. Alternatively, step index waveguides with a central core with one index of refraction and a cladding layer of a lower index of refraction may be produced. An adherent layer of glass soot 14 is built up on the bait rod 10 as it is rotated and translated in the hydrolysis flame 15. Both the preform 14 and the carbon coating 12 can be removed from the bait rod with no detrimental effect. Preform removal results from separation at the carbon-bait rod interface or from shearing of the carbon and not from shearing of the preform. This allows protection of the inner surface of the preform and easy removal of the bait rod. Examination of the preform shows a very smooth, undisturbed center hole.

The preform is then sintered in the usual manner as is depicted in FIG. 3. The carbon completely disintegrates by oxidation at about 800° C. which is approximately 500° lower than normal consolidation temperature. Inspection after consolidation shows a smooth clean inner surface that requires little, if any, hydrofluoric acid treatment. In many instances, the etching step may be eliminated completely, in which case the consolidation step can be carried out in such a way as to close the center hole. This allows faster, more economical operation of the draw facility which is depicted in FIG. 4.

Furthermore, closure of the center hole during consolidation permits the making of preforms with high internal stress (high radial change in composition and refractive index) because the elimination of the hole during consolidation removes one of the prominent sources of fractures in waveguides. This commonly occurs because of flaws on the interior surface of the consolidated (i.e. sintered) preform. Also, the invention has particular advantages in making high numerical aperture guides which require high dopant levels and consequently greater stress caused by steep thermal expansion coefficient changes, because, the smooth inner surface on the consolidated preform made in accordance with this invention can tolerate high stress.

Another advantage of the invention is the elimination of etching away approximately 4% of the weight of the preform as is routinely done in present practice where soft soot is initially deposited on the bait rod to facilitate bait removal and is later etched away.

The carbon coating can be applied by several other methods including dipping the rod in a carbon slurry or dipping the bait rod in wax and then charring it. The carbon coating must burn off during consolidation and the coating must not impart impurities to the preform. The following examples demonstrate the feasibility of this invention.

EXAMPLE 1

A 33 wt. % Aquadag ® E, Aqueous graphite dispersion, mixture was made in distilled water. Final weight percent graphite was 13%. This mixture was rolled for several hours and then poured into a Pyrex ® tube approximately 30 inches long and ¾" in diameter.

A clean, tapered alumina rod about 63 cm. long and tapering from 0.630 to 0.570 cm. diameter was carefully dipped in the mixture and removed. The surface of the adherent layer of graphite was inspected for flaws—lumps, inclusions, uneven areas—and allowed to air dry at room temperature several hours.

The prepared bait was next secured in a lathe normally used for preform production. Standard laydown procedures were used for the production of a parabolic blank except the soft preliminary soot laydown was omitted. The $GeO_2$ content was varied parabolically from 15 to 0 wt. % across the core, while $B_2O_3$ content was raised from 2 to 12 wt. %.

The soot was deposited by a burner having an inner and outer shield, both of which supply oxygen, and inner burners for the other gases. A gradient index guide was produced in which the $BCl_3$ was increased and the $GeCl_4$ was decreased as a ramp function of time. The settings used were as follows:

| | |
|---|---|
| Outer Shield | 4.0 L/min. |
| Inner Shield | 4.5 L/min. |
| Premix Gas | 6.0 L/min. |
| Premix Oxygen | 5.0 L/min. |
| By-pass $O_2$ | 0.5 L/min. |
| $SiCl_4$ | 8.0 gm/min. |
| $BCl_3$ | Ramp Program .097 gm/min.–1.17 gm/min. |
| $GeCl_4$ | Ramp Program .8 gm/min.–0 gm/min. |
| Traverse Speed | ~98cm/min. |
| Rotation Speed | ~300 RMP |
| Burner to bait distance | 14 cm |

The center hole of this preform after bait removal was excellent, no major flaws were noticed and it appeared very smooth and relatively undisturbed. The preform slipped from the bait rod far more easily than when the carbon coating was not used.

Next, the preform was consolidated at 1320° C. in Helium with a feed rate into the furnace of 0.1 inch/min. After consolidation the blank was allowed to cool and the inner surface examined. A significant improvement of inner hole surface was noted. The usual pits and scratch marks were absent. The preform was etched and then drawn into waveguides of 125 um diameter. These waveguides had the following properties:

| Fiber Reel # | Attenuation | NA | Band Width |
|---|---|---|---|
| 1 | 9.2 dB/km | .146 | 850 Megahertz |
| 2 | 4.8 | .146 | 560 |
| 3 | 4.0 | .150 | 560 |
| 4 | 3.8 | .156 | 560 |
| 5 | 4.5 | .150 | 540 |
| 6 | 4.8 | .150 | 500 |
| 7 | 5.3 | .150 | 490 |
| 8 | 5.1 | .150 | 480 |
| 9 | 5.6 | .150 | 420 |

These results show that the carbon does not adversely affect the attenuation of the waveguide.

EXAMPLE 2

An alumina bait rod of the type described above was coated with carbon soot, as follows: the rod was mounted in a lathe and rotated at 300 RPM; a flame consisting of acetylene burning in air was held under the rod so that the carbon soot produced by the flame was deposited on the rod; by moving the torch along the length of the rod, a uniform layer of carbon was deposited.

A preform was deposited on the coated bait rod, consolidated and drawn into fiber, all as described in example 1. The measured properties of the resulting optical waveguide are listed below:

| Fiber Reel # | Attenuation | NA | Band Width |
|---|---|---|---|
| 1 | 4.3 dB/km | .136 | 890 Megahertz |
| 2 | 5.2 | .129 | * |
| 3 | 5.7 | .139 | 770 |

*Too high to be measured, i.e. at or near the theoretical limit. While a particular embodiment of the invention has been shown and described, various modifications are within the true spirit and scope of the invention. The appended claims are intended to cover all such modifications.

We claim:

1. Apparatus for making preforms for optical waveguides comprising:
   a substantially cylindrical starting member having a smooth outside peripheral surface;
   a coating of particulate carbon without impurities on the outside periphery of said starting member, said carbon being present in an amount which is completely disintegrated during heating to the consolidation temperature of glassmaking particulate material; and
   means for applying said glassmaking particulate material to said starting member to form an adherent coating of glass; whereby the starting member can be removed from said glass by separation at the interface between the carbon and the starting member or shearing within the carbon layer, to produce a preform from the glass.

2. The apparatus recited in claim 1 wherein said starting member is tapered.

3. The apparatus recited in claim 1 wherein said starting member is an aluminum oxide mendril.

4. The apparatus recited in claim 1 wherein the means for applying glassmaking particulate material to said starting member includes;
   means for entraining predetermined amounts of each of a plurality of constituents in a vapor; and
   a burner for oxidizing said vapors in a flame to form a soot having a predetermined composition.

* * * * *

UNITED STATES PATENT AND TRADEMARK OFFICE
CERTIFICATE OF CORRECTION

PATENT NO. : 4,233,052
DATED : November 11, 1980
INVENTOR(S) : Ellen K. Dominick and George W. Scherer It is certified that error appears in the above-identified patent and that said Letters Patent are hereby corrected as shown below:

Column 2, line 42 "product" should be -- produce --.

Column 4, line 31 "RMP" should be -- RPM --.

Column 6, line 15 "mendril" should be -- mandril --.

Signed and Sealed this

Fifth Day of May 1981

[SEAL]

Attest:

RENE D. TEGTMEYER

Attesting Officer     Acting Commissioner of Patents and Trademarks